D. L. APPELBERRY.
BEEF SPLITTING MACHINE.
APPLICATION FILED OCT. 21, 1918. RENEWED MAY 29, 1920.
1,353,013.
Patented Sept. 14, 1920.
2 SHEETS—SHEET 2.
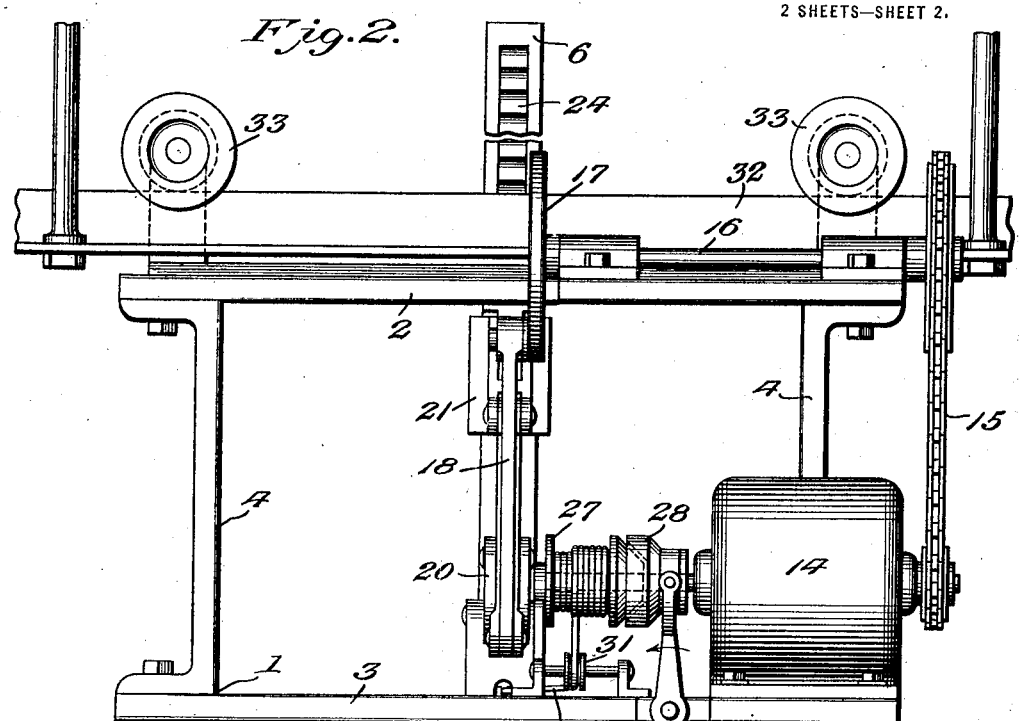
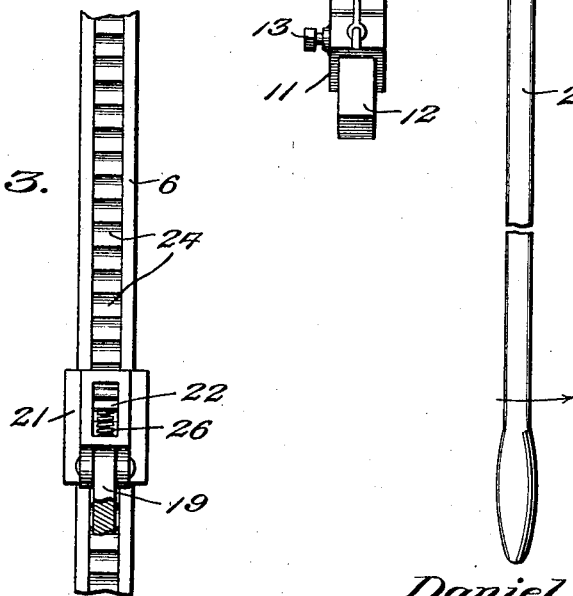
Witnesses
Edwin G. McKee
Inventor
Daniel L. Appelberry
By Victor J. Evans
Attorney

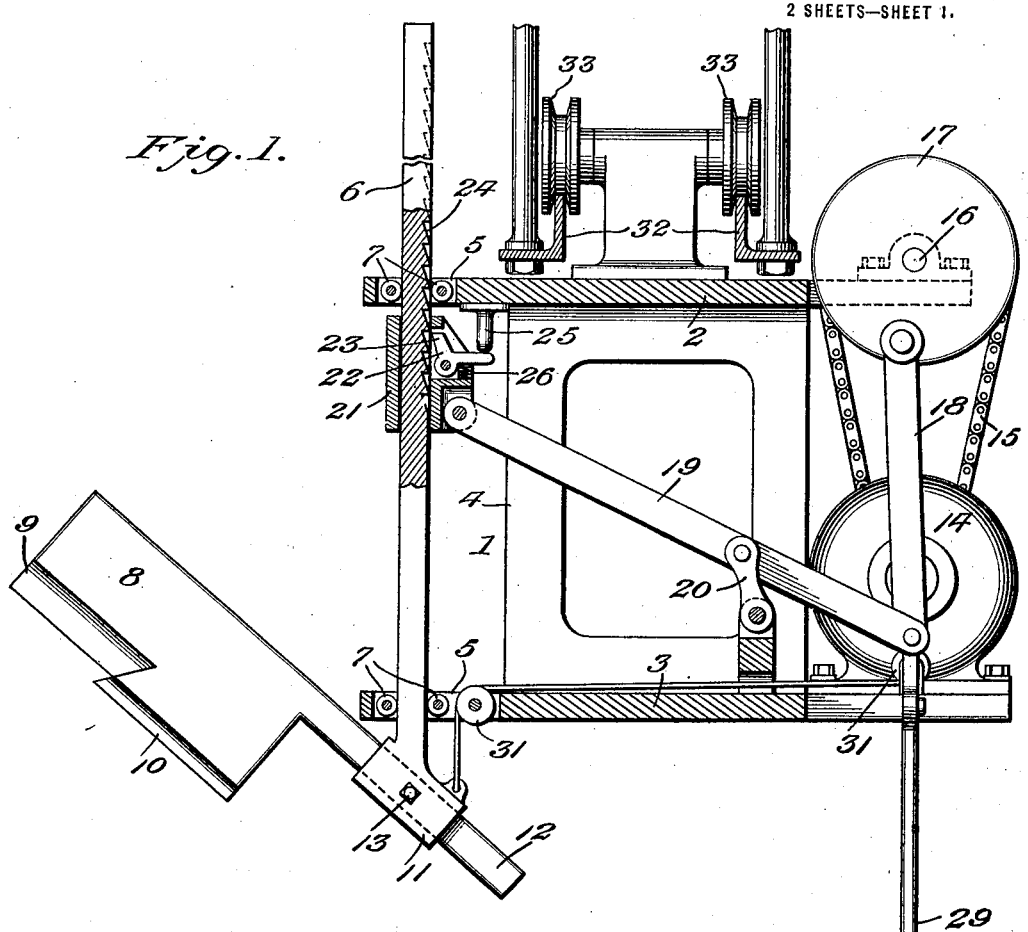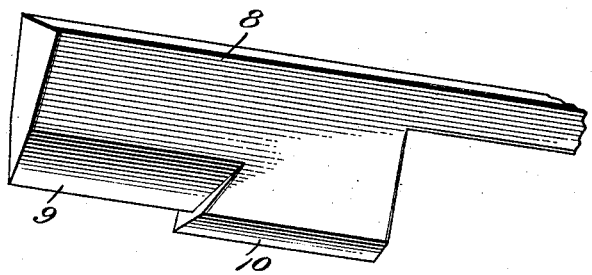

UNITED STATES PATENT OFFICE.

DANIEL L. APPELBERRY, OF HAMMOND, INDIANA.

BEEF-SPLITTING MACHINE.

1,353,013.  Specification of Letters Patent.  Patented Sept. 14, 1920.

Application filed October 21, 1918, Serial No. 259,066. Renewed May 29, 1920. Serial No. 385,386.

*To all whom it may concern:*

Be it known that I, DANIEL L. APPELBERRY, a citizen of the United States, residing at Hammond, in the county of Lake and State of Indiana, have invented new and useful Improvements in Beef-Splitting Machines, of which the following is a specification.

This invention relates to an improvement in machines for splitting beef or similar carcasses, in the use of which the carcass suspended in the usual manner is split into two approximately even parts along the line of the back bone.

Ordinarily this splitting is accomplished by hand, and requires considerable time and expertness to secure the desired result. With the improved machine forming the subject matter of this invention, the splitting operation is much more rapidly performed, and the resulting parts are more even than by the hand method, thereby avoiding practically all of the ordinary objections of such hand method.

The improved machine contemplates a splitting implement, which may be termed a cleaver, and mechanism whereby this implement may be elevated to the desired height and automatically released, to permit the cleaver in falling to impart a cutting and splitting operation to the carcass, this operation being repeated automatically until the carcass is completely split from end to end.

The invention further contemplates the mounting of the machine so that it may be readily moved from carcass to carcass, as such are usually suspended for the splitting operation, so that a single operator may readily and quickly split the respective carcasses in succession.

The invention is illustrated in the accompanying drawings, in which:—

Figure 1 is a side elevation of the improved machine.

Fig. 2 is a front elevation of the same.

Fig. 3 is a detail of the elevating means for the cleaver.

Fig. 4 is a perspective view of the cleaver.

The improved machine is here shown as comprising a frame 1, made up of upper and lower frame bars 2 and 3, and vertical tie bars 4. The bars may be of any appropriate material, and are preferably of material width to support the operating parts.

The bars 2 and 3 are each formed, about centrally of their lengths and adjacent their forward edges, with an opening 5, and in these openings, which are vertically alined, is slidably mounted an operating bar 6. Suitable guide rollers 7 are mounted in the openings for the operating bar. The lower end of the bar is provided with a splitting implement 8, here shown in the form of a cleaver, with the forward edge of the cutting edge of the usual V-type, as at 9. The rear portion of the cutting edge is also of the V-type but is thicker than the edge 9, and offset below the same. This lower cutting edge 10 is primarily designed to split the bone, and such edge, as well as the edge 9 may be appropriately formed other than as stated, to meet unusual conditions in use.

The cleaver is preferably supported at that angle to the operating bar, as will give the cleaver a proper cutting angle in the direct downward movement of the bar. The lower end of the bar may for this purpose be formed with a socket member 11, set at a proper angle, and adapted to receive a handle extension 12 of the cleaver. Fastening means 13, removably secures the cleaver in fixed relation to the bar.

The operating bar is designed to be elevated a predetermined distance, and then automatically released to permit the cleaver to do the designed work. The mechanism for this purpose comprises a motor 14, mounted on the frame and operating, through a sprocket wheel drive 15, a shaft 16, mounted in bearings on the upper frame bar. A disk 17 is secured on the shaft 16, and a link 18 is connected to the disk and to one end of a lever 19. The lever 19 is mounted on a swinging fulcrum, as a link 20 pivotally mounted on a block secured to the base, and carries at its free end a lifting member 21. The lifting member is in the form of a sleeve, slidably fitting the operating bar 6, and a dog 22 is pivotally mounted in the sleeve, and of angle formation. One end of the dog is formed, as at 23, to coöperate with any one of a series of teeth 24, formed in a central depressed portion of the bar 6, and the other end of the dog projects beyond the sleeve, so as to be engaged by a pin 25, depending from the upper frame bar 2. A spring 26 normally influences the dog to a position to engage the teeth 24.

The arrangement of the lever and operating mechanism is such, that the sleeve is continually reciprocated lengthwise the rod 6, and when the sleeve is in the lowered position, the dog will engage the adjacent tooth of the bar 6, and as the sleeve moves upwardly, the bar and therefore the cleaver will be raised. As the dog engages the pin, the bar is released, and falls by gravity for the splitting movement. This operation is repeated until the carcass is split, and it is to be noted that the operation is automatic, and that the distance traveled by the cleaver is the same in each movement.

After a carcass is split, it is necessary to raise the cleaver to a starting position for the next carcass, and for this purpose, a drum 27 is loosely mounted on the motor shaft, and controlled, in its operation by such shaft, through a clutch 28, manually governed by a lever 29, as clearly shown in Fig. 2. A cable 30 is wound about the drum, and over appropriately arranged idlers 31, and terminally connected to the bar 6, preferably near the socket member 11. With the clutch in, the drum winds the cable, with the effect to elevate the bar and cleaver to the starting position.

The improved splitting machine as a whole, is designed to be supported by an overhead trackway 32, which is arranged above the stalls provided for the reception of the carcasses. The frame 1 of the machine is provided with track-traveling wheels, or the like, as at 33, to coöperate with such trackway. The machine may thus be moved as a unit from stall to stall and the splitting operation quickly and readily performed. Of course the usual wall or socket connections may be arranged to each stall to permit the necessary connections for operating the motor.

Having thus described the invention, what is claimed as new, is:—

1. A beef-splitting machine, comprising a frame, an operating bar slidably mounted therein, a cleaver carried by the bar, means for raising the bar, and a trip carried by the frame to release the raising means.

2. A beef-splitting machine, comprising a frame, an operating bar slidably mounted therein, a cleaver carried by the bar, means slidably embracing the bar and provided with bar engaging means, and means carried by the frame to trip said engaging means at a predetermined point.

3. A beef-splitting machine, comprising a frame, an operating bar slidably mounted therein and formed with a series of teeth, a sleeve slidably embracing the bar and having a dog to engage the teeth of the bar, means for operating the sleeve, and a trip for the dog at a predetermined point in the movement of the sleeve.

4. A beef splitting machine, comprising a frame, an operating bar mounted therein and formed with a series of teeth, a sleeve slidably embracing the bar, a dog carried by the sleeve to engage the teeth of the bar, a trip to force the dog from such engagement, a motor, and lever connections between the motor and sleeve.

5. A cleaver for beef-splitting machines, having a forward cutting edge, and a rear cutting edge, said rear cutting edge being arranged below the forward cutting edge with the surfaces forming such edge at a greater angle than are the surfaces forming the forward cutting edge.

6. A beef splitting machine, comprising a frame, a bar slidable in the frame, a cleaver carried by the bar, and means operating to engage the bar at any one of a series of points for raising the cleaver to an initial position.

7. A beef splitting machine, comprising a frame, a bar slidable in the frame, a cleaver carried by the bar, means adapted to engage the bar at any one of a series of points to raise the cleaver to an initial position, and means for automatically tripping said bar gripping means at a predetermined point, whereby to release the cleaver and bar for a gravital fall.

In testimony whereof I affix my signature.

DANIEL L. APPELBERRY.

Witnesses:
 B. GEHRING,
 G. S. VAN ANTWERP.